US009546639B2

(12) United States Patent
Amirian

(10) Patent No.: US 9,546,639 B2
(45) Date of Patent: Jan. 17, 2017

(54) HYDRAULIC DEVICE OF REVERSIBLE TYPE FOR THE CONVERSION OF ENERGY

(76) Inventor: Abdullah Amirian, Montelupo Fiorentino (IT)

( * ) Notice: Subject to any disclaimer, the term of this patent is extended or adjusted under 35 U.S.C. 154(b) by 737 days.

(21) Appl. No.: 14/110,780

(22) PCT Filed: Apr. 13, 2012

(86) PCT No.: PCT/IB2012/051823
§ 371 (c)(1),
(2), (4) Date: Oct. 9, 2013

(87) PCT Pub. No.: WO2012/140606
PCT Pub. Date: Oct. 18, 2012

(65) Prior Publication Data
US 2014/0037450 A1    Feb. 6, 2014

(30) Foreign Application Priority Data

Apr. 14, 2011   (IT) ................ FI2011A0071

(51) Int. Cl.
| F03B 3/14 | (2006.01) |
| F03B 3/10 | (2006.01) |
| F03B 17/06 | (2006.01) |

(52) U.S. Cl.
CPC .............. *F03B 3/145* (2013.01); *F03B 3/10* (2013.01); *F03B 3/103* (2013.01); *F03B 17/068* (2013.01); *F05B 2250/141* (2013.01); *Y02E 10/223* (2013.01); *Y02E 10/28* (2013.01)

(58) Field of Classification Search
CPC .............. F03B 3/145; F03B 3/14; F03B 3/10; F03B 3/103; F03B 15/06; F03B 17/065; F03B 17/066; F03B 17/067; F03B 17/068; F03B 17/062; F05B 2250/141
USPC ............................................. 416/98
See application file for complete search history.

(56) References Cited

U.S. PATENT DOCUMENTS

| 1,478,657 A | 12/1923 | Kelly | |
| 1,846,162 A * | 2/1932 | Thomas | F03B 17/065 416/52 |
| 7,083,382 B2 * | 8/2006 | Ursua | F03D 3/005 416/110 |
| 2011/0020123 A1 * | 1/2011 | Anderson | F03D 3/068 416/98 |

FOREIGN PATENT DOCUMENTS

| DE | 11973 | 1/1881 |
| DE | 39 38 748 A1 | 6/1990 |
| EP | 2 133 557 A2 | 12/2009 |

* cited by examiner

*Primary Examiner* — Craig Kim
*Assistant Examiner* — Michael Sehn
(74) *Attorney, Agent, or Firm* — Abelman, Frayne & Schwab

(57) ABSTRACT

The present invention relates to a hydraulic device of reversible type adapted to be used both as a water turbine and a hydraulic pump. Said device has characteristics of simplicity of construction and use. In the case of use as a water turbine it does not require distributors of a particular shape and does not require drops of great heights being adapted to take advantage of the pressure of the fluid and not only of the speed thereof.

9 Claims, 3 Drawing Sheets

HYDRAULIC DEVICE OF REVERSIBLE TYPE FOR THE CONVERSION OF ENERGY

FIELD OF THE INVENTION

The present invention relates to the field of hydraulic devices of reversible type with particular reference to the field of water turbines and hydraulic pumps.

STATE OF THE ART

Water turbines are mechanical devices which serve to transform the kinetic energy of a liquid into mechanical energy. They have been known, in various models and embodiments, since antiquity and have been widely used since the seventeenth century. They have a high efficiency, often over 80%, and for this reason they are much appreciated and widely used, even if their installation requires infrastructures adapted to convey the water in a suitable way onto the blades of the impeller of the turbine.

The water turbine essentially consists of a fixed member, the distributor, and a movable member, the impeller. The distributor performs the following essential tasks: directing the incoming flow towards the impeller giving the appropriate direction thereto, regulating the flow by means of possible reduction members, causing a partial or total transformation of the pressure energy possessed by the flow into kinetic energy. The impeller transforms the potential and/or kinetic energy of the water into mechanical energy produced on the motor shaft connected thereto. When the transformation from potential to kinetic energy takes place completely in the distributor, it is an impulse turbine, otherwise it is a reaction turbine.

Examples of water turbines used today are the Pelton, the Francis, the Kaplan, the bulb turbines, the Banki, the Turg, etc.

The Pelton turbine is currently the most widely used type of impulse turbine. In this type of turbine, the water is channelled into a penstock, at the end of which there is an adjustable nozzle. The nozzle is substantially a narrowing of the pipe, thanks to which the speed of the water increases up to a maximum value at the outlet of the conduit and at the impact with the impeller blades.

The disadvantages connected to Pelton-type turbines are related to the constructional complexity of their parts, both the impeller and the distributor, and the impossibility of easily integrating them with pre-existing water distribution plants. Other disadvantages mainly regard the fact that the Pelton turbine is generally used for large drops (usually between 300 and 1400 m) and for small flow rates (typically less than 50 m$^3$/s), and is therefore usually only used in mountain hydroelectric basins. Furthermore, the Pelton turbine has an important intrinsic limitation given by the fact that a part of the drop is always lost. The impeller of the Pelton turbine, being unable to be immersed in the tail race, is always kept raised with respect to the surface of the free water, and therefore a part of the drop, at least greater than the radius thereof, is unused. Said disadvantage is clearly less significant the greater the drop of the water used.

Finally, a further disadvantage related to Pelton-type turbines is related to the number of revolutions which is limited by the safety limit value on the centrifugal force to which the impeller itself is subjected, which in turn depends on the size and dimensions of said impeller. Given the imposing size of Pelton impellers, the maximum number of revolutions is therefore rather limited.

The present invention relates to a hydraulic device of reversible type of new conception which introduces functional characteristics such as to allow the overcoming of the disadvantages related to the use of traditional turbines, and in particular related to the use of Pelton-type turbines, and has the further advantage of reversibility which also allows the use thereof as a hydraulic pump.

The hydraulic device of reversible type according to the present invention is of simple structure and simple construction, when used as a turbine it does not require distributors of a particular shape, it does not require drops of great heights as it is adapted to work by taking advantage of the pressure of the fluid and not only of the speed thereof.

Furthermore, the hydraulic device of reversible type according to the present invention can be advantageously provided in any size and dimension and can be associated with pre-existing water distribution plants by means of minimum adjustments, allowing the creation of micro energy generation systems located, for example, along the water distribution conduits of residential areas.

An object of the present invention is the introduction of a hydraulic device for the production of energy, adapted to overcome the disadvantages related to the use of turbines of the traditional type and in particular of Pelton-type turbines.

A further object of the present invention is the introduction of a hydraulic device of reversible type adapted to be used as both a water turbine and a hydraulic pump.

SUMMARY OF THE INVENTION

The present invention relates to a hydraulic device of reversible type adapted to be used as both a water turbine and a hydraulic pump. Said device has characteristics of simplicity of construction and use. In the case of use as a water turbine it does not require distributors of a particular shape and does not require drops of great heights being adapted to take advantage of the pressure of the fluid and not only of the speed thereof.

DETAILED DESCRIPTION OF THE INVENTION

Figure 1:
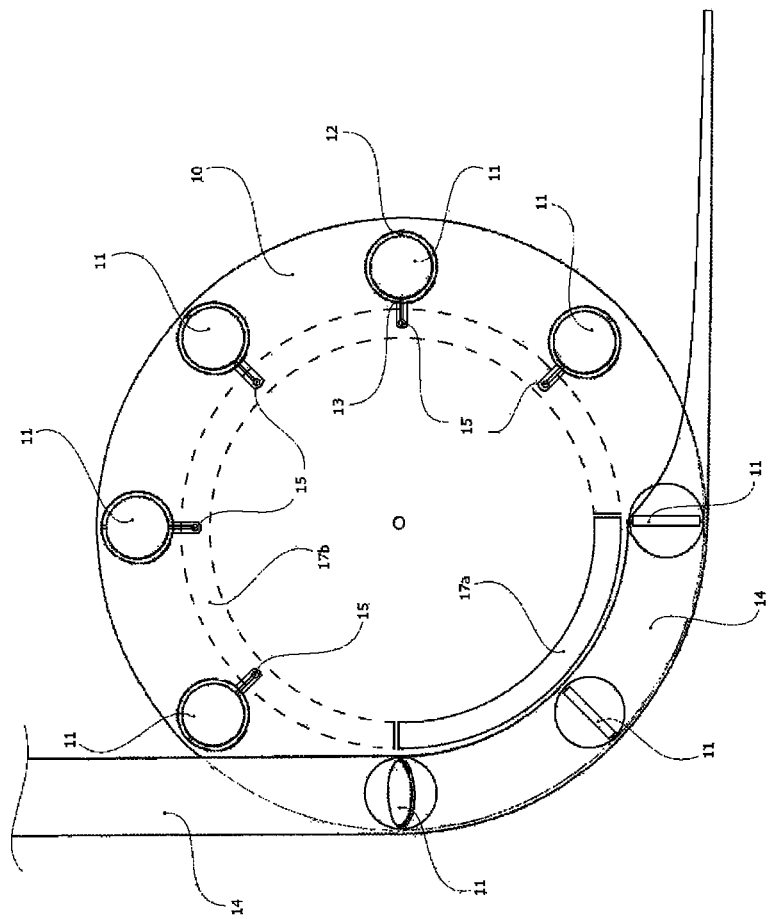
FIG. 1 shows the impeller of the hydraulic device according to the present invention and the relative distribution conduit 14.
Figure 2:
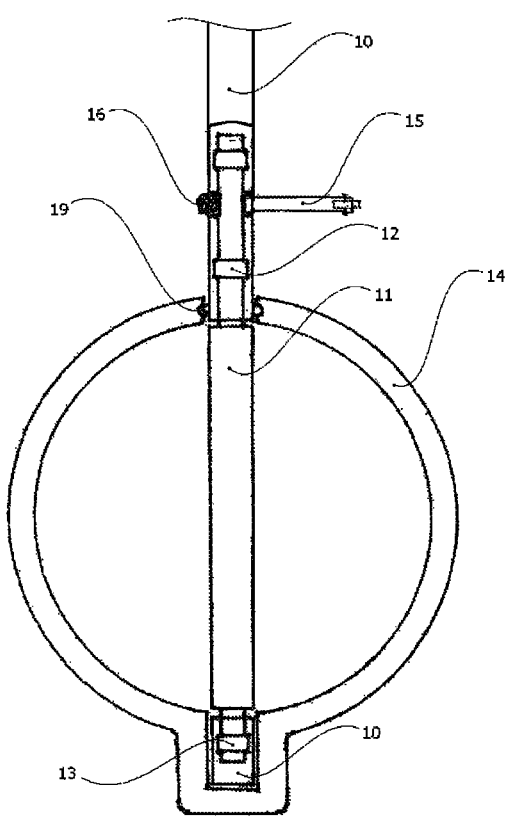
FIG. 2 shows a detail of a preferred embodiment of the means adapted to modify the position of the discs 11 with respect to impeller 10, according to their position with respect to distribution conduit 14.
Figure 3:
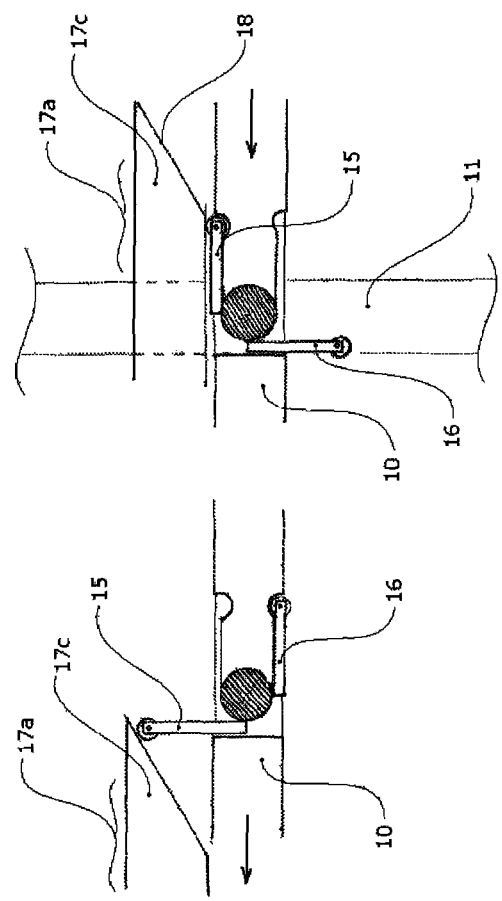
FIG. 3 shows a further detail of the means adapted to modify the position of the discs 11 with respect to impeller 10, according to their position with respect to distribution conduit 14 and the relative discs 11.

With reference to accompanying FIGS. 1-3, the device object of the present invention comprises an impeller, preferably disc-shaped 10, made of material provided with the necessary characteristics of resistance and durability, such as steel, comprising a plurality of circular discs or polygons provided with axial symmetry 11, hereafter indicated simply as discs, of smaller dimensions and arranged at the periphery of said impeller 10. Said discs 11 are accommodated in specific seats having the same shape and are hinged at two points 12, 13, corresponding to two ends of the diameter thereof or of the spin axis thereof, lying on the diameter of said impeller 10, so as to be able to rotate thereabout.

Said impeller 10 is adapted to be integrally connected to a motor shaft suitably accommodated at the centre of said impeller 10 and is further adapted to be associated with a distribution conduit 14, preferably comprising a radius bending which is substantially equal to the radius of said impeller 10. Said distribution conduit 14 has an inner diameter greater than the diameter or than the larger dimension of said discs 11 and comprises a longitudinal slit of a width barely greater than the thickness of said impeller 10. In this way, said impeller 10 is free to rotate about the shaft passing through the geometrical axis thereof, having a part of the periphery thereof inserted within said distribution conduit 14 through said longitudinal slit so that said discs 11 are completely contained within said distribution conduit 14 and free to rotate about their own diameter.

Advantageously, said longitudinal slit adapted to accommodate the peripheral part of said impeller 10 can be provided with a suitable gasket 19 along the edges thereof in order to limit the loss of fluid in the case in which the device according to the present invention is arranged within a water distribution pipeline. Furthermore, said distribution conduit 14, at said longitudinal slit, may comprise suitable reinforcing means adapted to keep the width of said longitudinal cut approximately constant.

Said discs 11 further comprise means adapted to modify their position with respect to said impeller 10, according to their position with respect to said distribution conduit 14, so as to tilt said discs 11 with respect to the plane of said impeller 10 when said discs are within said distribution conduit 14.

In greater detail, during the operation of the device according to the present invention, said discs 11 are coplanar to said impeller 10, when they are outside of said distribution conduit 14, while they are tilted with respect to the plane of said impeller 10 when they are within said distribution conduit 14.

In this way, during the operation of the device according to the present invention, the fluid which flows within said distribution conduit 14, in a direction which is tangential with respect to the surface of said impeller 10, will be such to exert a bias on the effective surfaces of said discs 11 which are inclined with respect to the flow direction of the fluid within said distribution conduit 14.

In a preferred embodiment of the present invention, to be considered as a non-limiting example of the device according to the present invention, said means adapted to modify the position of said discs 11 with respect to said impeller 10 according to their position with respect to said distribution conduit 14, comprise:

a plurality of pairs of shafts 15, 16, each of which is rigidly connected to each of said discs 11, external thereto and free to rotate about the diameter of said discs 11, said shafts 15, 16 being orthogonal to each other and each adapted to rotate by 90° so as to move between two boundary positions: the first coplanar and the second orthogonal to the plane of said impeller 10. Said pairs of shafts 15, 16 are furthermore arranged in such a position to always remain on the outside of said distribution conduit 14;

a guide of circular shape—equipped with suitable support means external to said impeller 10—associated with said impeller 10 and comprising two portions, a first portion 17*a* comprising an arc of circle arranged on one side of said impeller 10 in position close to the bending of said distribution conduit 14 and having such an extension so as to substantially correspond to the extension of the bending of said distribution conduit 14 and adapted to be engaged with one of said shafts 15,16 so as to force the gradual rotation thereof in position parallel to the plane of said primary disc 10, hence thus forcing said discs 11 to lie in orthogonal position with respect to the plane of said impeller 10; a second portion 17*b* comprising an arc of circle comprising an arc of circle complementary to the one of said first portion arranged on the opposite side to said impeller 10 and adapted to be engaged with the other of said shafts 15, 16 so as to force the rotation thereof in position parallel to the plane of said impeller 10, hence thus forcing said discs 11 to lie in coplanar position to the plane of said impeller 10.

Operation is such that, if we consider the use of the device according to the present invention as a turbine—i.e. so as to transform the kinetic energy of the fluid within said distribution conduit 14, in a torque applied to the motor shaft integral with said impeller 10—during the rotation of said impeller 10, due to the interaction between said pair of shafts 15, 16 and said guides 17*a*, 17*b* we have that discs 11 in position distant from the bending of said distribution conduit 14, are normally coplanar thereto, while the discs 11 in position internal to the bending of said distribution conduit 14, are forced to take on a position which is no longer coplanar but tilted with respect to said impeller 10. In this way, the discs 11 which are tilted with respect to said impeller will be subjected to an effective bias by the fluid which flows in said distribution conduit 14 which resolves in an engine torque applied to the shaft connected to said impeller 10.

The transition of said discs 11, due to portion 17*a*, of said guide, from the position coplanar to said impeller 10 to the position orthogonal to said impeller 10 will take place in a gradual way in order to avoid the possible water hammer of the fluid which flows in said distribution conduit 14. With reference to accompanying FIG. 3, to promote said gradual transition of the discs 11, portion 17*a* of said guide comprises an initial part 17*c* having an oblique profile 18 capable of being engaged with said shafts 15 and promote the gradual rotation thereof. The gradualness of the transition may be adjusted by varying the slope of said oblique profile 18. Upon termination of the course of said shafts 15 on profile 18, disc 11 takes on the position orthogonal with respect to impeller 10 and maintains it until the outlet from the conduit 14.

In a second preferred embodiment of the device according to the present invention there will only be one single shaft integral with each of said discs 11, said shaft being equipped with elastic means adapted to cause it to take on a balanced position wherein said shaft is orthogonal to the plane of said impeller 10 and disc 11 associated therewith is coplanar to the plane of said impeller 10. In this second preferred embodiment of the device according to the present invention, said guide will only comprise said first portion 17*a*.

In the dual case of the use of the present invention as a pump, operation will obviously be the opposite with the driving power transferred from the motor shaft to the fluid contained in the distribution conduit 14.

The invention claimed is:

1. A hydraulic device of reversible type comprising: an impeller in turn comprising a plurality of elements provided with axial symmetry, accommodated in specific seats having the same shape as said elements and arranged at the periphery of said impeller, said elements being hinged at two points corresponding to two ends of the diameter or of the spin axis of said elements, so as to be able to rotate about said spin axis; a distribution conduit adapted to conduct a fluid, associated with said impeller and comprising a radius bending substantially equal to the radius of said impeller, said distribution conduit comprising an inner diameter greater than the diameter or than the larger size of said elements and a longitudinal slit having width greater than the thickness of said impeller adapted to house the peripheral part of said impeller; means adapted to modify the position of said elements with respect to said impeller, according to their position with respect to said distribution conduit, so as to tilt said elements with respect to the plane of said impeller when said elements are within said distribution conduit.

2. The device according to claim 1, wherein said distribution conduit, at said longitudinal slit, comprises suitable reinforcing means adapted to keep the width of said longitudinal cut approximately constant.

3. The device according to claim 1, wherein said longitudinal slit adapted to house the peripheral part of said impeller comprises a suitable gasket along the edges thereof.

4. The device according to claim 1, wherein said means adapted to modify the position of said elements with respect to said impeller according to the position thereof with respect to said distribution conduit, comprise: a plurality of pairs of shafts, each of which is rigidly connected to each of said elements, external thereto and free to rotate about the diameter of said elements, said shafts being orthogonal to each other and each adapted to rotate by 90° so as to move between two boundary positions: the first coplanar and the second orthogonal to the plane of said impeller, said pairs of shafts being arranged in such a position to always remain on the outside of said distribution conduit; a guide having circular shape associated with said impeller and comprising a first portion comprising an arc of circle arranged on one side of said impeller in position close to the bending of said distribution conduit and having such an extension to substantially correspond to the extension of the bending of said distribution conduit and adapted to be engaged with one of said shafts so as to force the gradual rotation thereof in position parallel to the plane of said impeller, hence thus forcing said elements to lie in oblique position with respect to the plane of said impeller; a second portion comprising an arc of circle complementary to the one of said first portion arranged on the opposite side to said impeller and adapted to be engaged with the other of said shafts so as to force the movement thereof in position parallel to the plane of said impeller, hence thus forcing said elements to lie in coplanar position to the plane of said impeller.

5. The device according to claim 4, wherein said guide comprises suitable support means external to said impeller.

6. The device according to claim 4, wherein said first portion of said guide comprises an initial part having an oblique profile capable of being engaged with said shafts so as to promote the gradual rotation thereof.

7. The device according to claim 1, wherein said means adapted to modify the position of said elements with respect to said impeller according to the position thereof with respect to said distribution conduit, comprise: one single shaft integral with each of said elements, said shaft being equipped with elastic means adapted to cause it to take on a balanced position wherein said shaft is orthogonal to the plane of said impeller and said element associated therewith is coplanar to the plane of said impeller; a guide comprising an arc of circle arranged on one side of said impeller in position close to the bending of said distribution conduit and having such an extension as to substantially correspond to the extension of the bending of said distribution conduit and adapted to be engaged with said shaft so as to force the gradual rotation thereof in position parallel to the plane of said impeller, hence thus forcing the corresponding element to lie in oblique position with respect to the plane of said impeller.

8. The water turbine comprising the device according to claim 1.

9. The hydraulic pump comprising the device according to claim 1.

* * * * *